US012738532B2

(12) United States Patent
Konya et al.

(10) Patent No.: US 12,738,532 B2

(45) Date of Patent: Sep. 15, 2026

(54) METHOD FOR PRODUCING LGPS-TYPE SOLID ELECTROLYTE

(71) Applicant: MITSUBISHI GAS CHEMICAL COMPANY, INC., Tokyo (JP)

(72) Inventors: Masashi Konya, Niigata (JP); Kazuki Tamai, Niigata (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 505 days.

(21) Appl. No.: 18/285,423

(22) PCT Filed: Mar. 23, 2022

(86) PCT No.: PCT/JP2022/013405

§ 371 (c)(1),
(2) Date: Oct. 3, 2023

(87) PCT Pub. No.: WO2022/215518

PCT Pub. Date: Oct. 13, 2022

(65) Prior Publication Data

US 2024/0194937 A1 Jun. 13, 2024

(30) Foreign Application Priority Data

Apr. 7, 2021 (JP) ................................ 2021-065248

(51) Int. Cl.
*H01M 10/0562* (2010.01)

(52) U.S. Cl.
CPC ................. *H01M 10/0562* (2013.01); *H01M 2300/0068* (2013.01)

(58) Field of Classification Search
None
See application file for complete search history.

(56) References Cited

U.S. PATENT DOCUMENTS

2020/0020977 A1 1/2020 Katori et al.

FOREIGN PATENT DOCUMENTS

| | | | |
|---|---|---|---|
| JP | 2017-45613 | A | 3/2017 |
| JP | 2020-027780 | A | 2/2020 |
| JP | 2020-27781 | A | 2/2020 |
| WO | 2018/173939 | A1 | 9/2018 |

OTHER PUBLICATIONS

Supplementary European Search Report dated Dec. 5, 2024, in European family member application No. 22784503.9.
Bron et al., “An Affordable Lithium Superionic Conductor”, J. Am. Chem. Soc., Sep. 30, 2013, pp. 15694-15697.
Vinado et al., “Electrochemical and interfacial behavior of all solid state batteries using Li10SnP2S12 solid electrolyte”, Journal of Power Sources 396, Jun. 19, 2018, pp. 824-830.
Bizhu Zheng, *Nano Energy*, Idoi.c /10.10166. 2, pp. 1-10.

(Continued)

*Primary Examiner* — Colin W. Slifka
(74) *Attorney, Agent, or Firm* — GREENBLUM & BERNSTEIN, P.L.C.

(57) ABSTRACT

A method for producing an LGPS-type solid electrolyte mixing $Li_3PS_4$ crystals having an average grain size (D50) of 0.1 to 5 μm and crystals that are formed of Li, Sn and S to produce a precursor, while having an average grain size (D50) of 0.1 to 5 μm; and subjecting the precursor to heat treatment at 300 to 700° C.

11 Claims, 3 Drawing Sheets

(56) References Cited

OTHER PUBLICATIONS

International Search Report issued May 31, 2022 in International Bureau of WIPO Patent Application No. PCT/JP2022/013405 with an English translation thereof.
Written Opinion issued May 31, 2022 in International Bureau of WIPO Patent Application No. PCT/JP2022/013405 with an English translation thereof.
Office Action, dated Jun. 25, 2025 in Russian family member application No. 2023120454, with English language translation thereof.
Gladysheva I.V. et al. Chemistry of elements, Tambov State Technical University, Tambov, 2013, p. 7, paragraph 8-p. 8, paragraph 1[on-line] [found Jun. 23, 2025] Found at <https://www.tstu.ru/book/elib/pdf/2013/gladysheva-a.pdf>.
Sun, et al., "Superionic Conductors: $Li_{10+8}[Sn_ySi_{1-y}]_{1+\delta}P_{2-\delta}S_{12}$ with a $Li_{10}GeP_2S_{12}$-type Structure in the $Li_3PS_4$-$Li_4SnS_4$-$Li_4SiS_4$ Quasi-ternary System", Chem. Mater. 2017, 5858-5864.

[Figure 1]
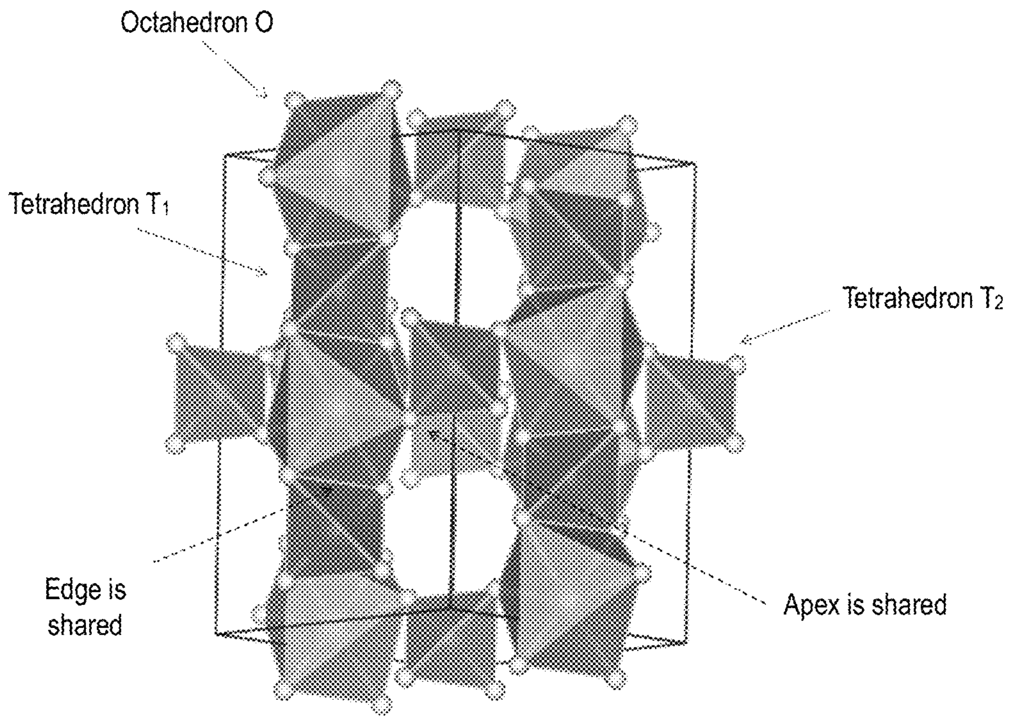
[Figure 2]
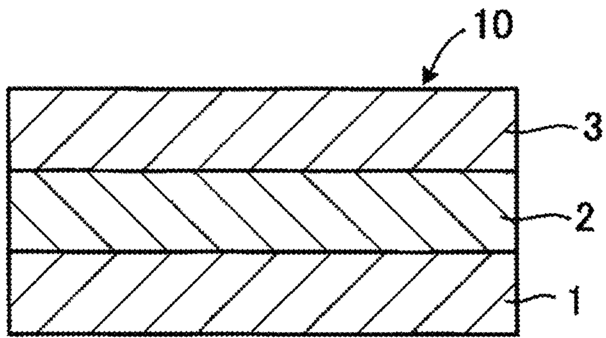

[Figure 3]
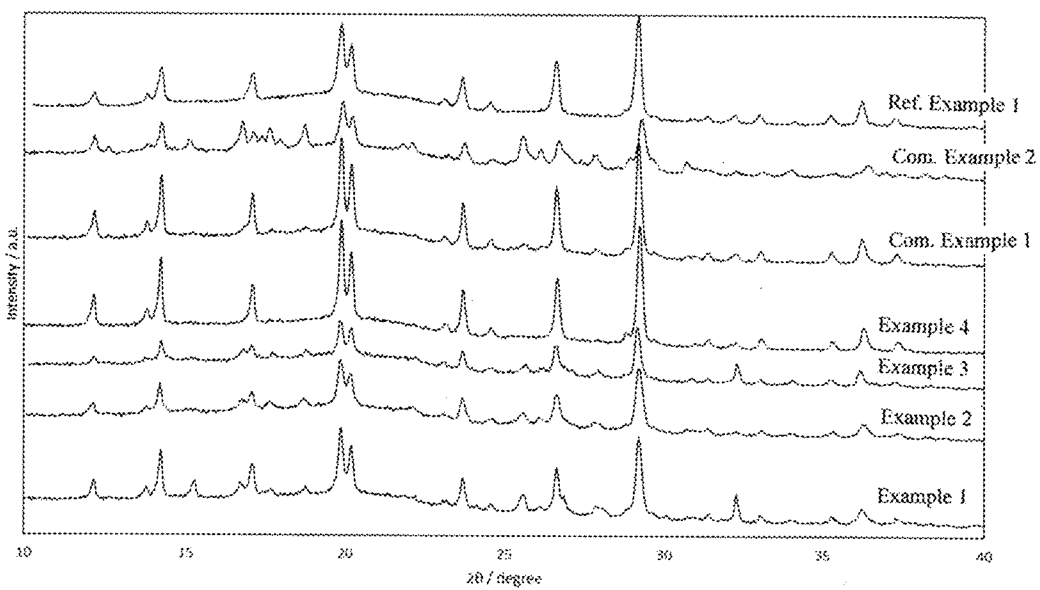
[Figure 4]
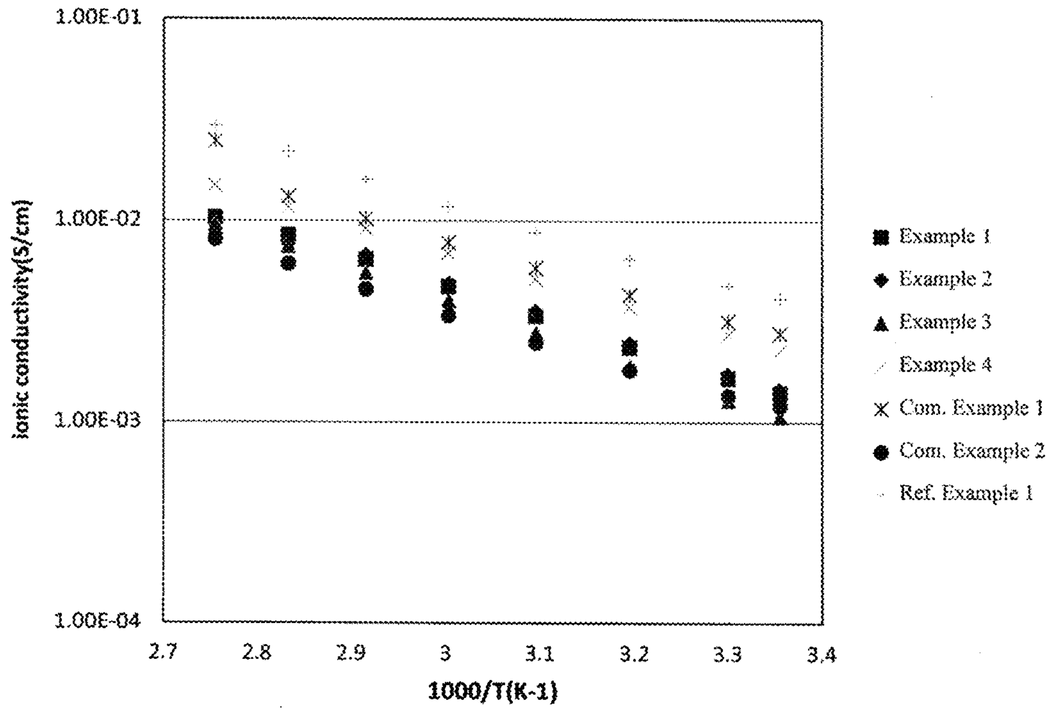

[Figure 5]
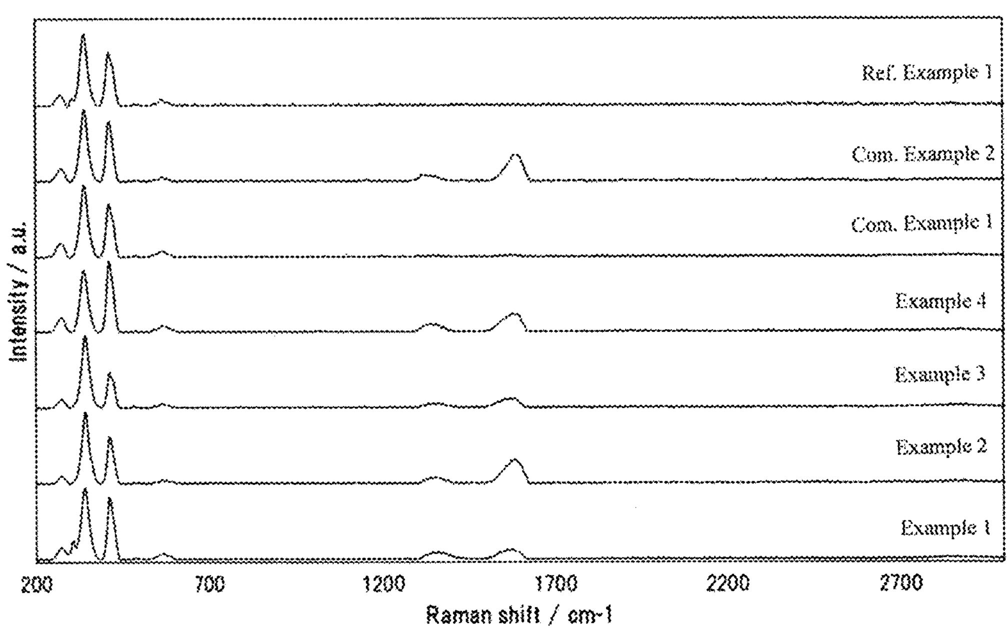

METHOD FOR PRODUCING LGPS-TYPE SOLID ELECTROLYTE

TECHNICAL FIELD

The present invention relates to a method for producing an LGPS-based solid electrolyte. LGPS-based solid electrolytes refer to solid electrolytes having a specific crystal structure including Li, P and S, but the present invention relates to a solid electrolyte including Li, Sn, P and S.

BACKGROUND ART

Recently, a demand for lithium ion secondary batteries has been increased in applications including portable information terminals, portable electronic equipments, electric vehicles, hybrid electric vehicles and stationary power storage systems. However, currently, a flammable organic solvent is used as an electrolytic solution in lithium ion secondary batteries, and a strong exterior is required so that an organic solvent does not leak out. Further, for example, in the case of portable personal computers, it is necessary to employ a structure against a risk at the time when an electrolytic solution leaks out. Thus, there is a limitation on structures of devices.

Moreover, the range of applications thereof has been widened to movable bodies such as vehicles and aircrafts, and a high capacity is desired for stationary lithium ion secondary batteries. Under such circumstances, importance tends to be placed on safety more than before, and efforts are concentrated on the development of an all-solid-state lithium ion secondary battery in which none of toxic substances such as organic solvents is used.

For example, use of an oxide, phosphate compound, organic polymer, sulfide or the like as a solid electrolyte in an all-solid-state lithium ion secondary battery has been examined.

Among these solid electrolytes, the sulfide has characteristics that it has high ionic conductivity and is relatively soft, and that it is easy to form the interface between solids. The sulfide is stable with respect to active materials and has been developed as a practical solid electrolyte.

Among sulfide solid electrolytes, there is an LGPS-based solid electrolyte having a specific crystal structure (Patent Document 1). Among sulfide solid electrolytes, LGPS has significantly high ion conductivity and can stably act at from a low temperature of −30° C. to a high temperature of 100° C., and therefore practical use thereof is highly expected.

The development of compositions for LGPS-based solid electrolytes not using expensive Ge has been advanced. Since an Sn-containing LGPS-based solid electrolyte has good ionic conductivity and realizes low cost, practical use thereof is highly expected (Non-Patent Documents 1 and 2).

In order to solve problems including obtaining high-energy density and high output power of batteries using a solid electrolyte, it is required to reduce the interface resistance between a solid electrolyte layer and an electrode. Since it is expected that reduction in the interface resistance between a solid electrolyte and an electrode can be realized by microparticulation of the solid electrolyte, a solid electrolyte having a small particle diameter is desired.

Examples of general techniques for microparticulation of a solid electrolyte include pulverization methods in which a ball mill, jet mill or the like is used after synthesis of coarse particles. However, the pulverization methods are not suitable for increasing in size due to problems in terms of processes. Further, it is known that $Li_{10}SnP_2S_{12}$, which is one of Sn-containing LGPS-based solid electrolytes, is decomposed when energy of pulverization or the like is given (Non-Patent Document 3). For this reason, it is desired to produce a solid electrolyte having a small particle diameter without performing pulverization, etc.

PRIOR ART DOCUMENTS

Patent Documents

Patent Document 1: WO2018/173939

Non-Patent Documents

Non-Patent Document 1: Journal of Power Sources 396 (2018) 824-830

Non-Patent Document 2: J. Am. Chem. Soc. 2013, 135, 15694-15697

Non-Patent Document 3: Nano Energy Volume 67, January 2020, 104252

SUMMARY OF THE INVENTION

Problems to be Solved by the Invention

Under the above-described circumstances, a problem to be solved by the present invention is to provide a method for producing an LGPS-based solid electrolyte, which includes Sn and has a small particle diameter, without performing pulverization, etc.

Means for Solving the Problems

The present inventors diligently made researches in consideration of the above-described problem and obtained an unexpected finding that by mixing $Li_3PS_4$ crystals having a specific average particle diameter with crystals that are formed of Li, Sn and S to be subjected to calcining, fine particles of an LGPS-based solid electrolyte including Sn can be produced without performing pulverization, etc.

Specifically, the present invention is as described below.

<1> A method for producing an LGPS-based solid electrolyte, which comprises:

- a step in which $Li_3PS_4$ crystals having an average particle diameter (D50) of 0.1 to 5 μm are mixed with crystals that are formed of Li, Sn and S, the crystals having an average particle diameter (D50) of 0.1 to 5 μm, to prepare a precursor; and
- a step in which the precursor is subjected to a heat treatment at 300 to 700° C.

<2> The method according to item <1>, wherein the obtained LGPS-based solid electrolyte has an average particle diameter (D50) of 0.5 to 5 μm.

<3> The method according to item <1> or <2>, wherein the LGPS-based solid electrolyte has peaks at at least $2\theta=20.18°\pm0.50°$, $20.44°\pm0.50°$, $26.96°\pm0.50°$ and $29.58°\pm0.50°$ in X-ray diffraction (CuKα: $\lambda=1.5405$ Å).

<4> The method according to any one of items <1> to <3>, wherein the $Li_3PS_4$ crystals are $\beta$-$Li_3PS_4$.

<5> The method according to any one of items <1> to <4>, wherein the heat treatment step is carried out under inert gas atmosphere.

<6> The method according to any one of items <1> to <5>, wherein the LGPS-based solid electrolyte has an octahedron O composed of Li and S, a tetrahedron $T_1$ composed of S and at least one element selected from the group consisting of P and Sn, and a tetrahedron $T_2$ composed of P and S, and mainly includes a crystal structure in which the tetrahedron $T_1$ and the octahedron O share an edge and the tetrahedron $T_2$ and the octahedron O share an apex.

<7> The method according to any one of items <1> to <6>, wherein the crystals that are formed of Li, Sn and S have a composition of $Li_4SnS_4$.

Advantageous Effect of the Invention

According to the present invention, it is possible to provide a method for producing an LGPS-based solid electrolyte having a small particle diameter. In addition, according to the present invention, it is possible to provide a formed body obtained by heating and forming the LGPS-based solid electrolyte and an all-solid-state battery including the LGPS-based solid electrolyte.

BRIEF DESCRIPTION OF THE DRAWINGS

FIG. 1 is a schematic view showing a crystal structure of an LGPS-based solid electrolyte according to one embodiment of the present invention.

FIG. 2 is a schematic cross sectional view of an all-solid-state battery according to one embodiment of the present invention.

FIG. 3 is a graph showing the results of the X-ray diffraction measurement of the LGPS-based solid electrolytes obtained in Examples 1 to 4, Comparative Examples 1 to 2 and Reference Example 1.

FIG. 4 is a graph showing the results of the ion conductivity measurement of the LGPS-based solid electrolytes obtained in Examples 1 to 4, Comparative Examples 1 to 2 and Reference Example 1.

FIG. 5 is a graph showing the results of Raman spectroscopy of the LGPS-based solid electrolytes obtained in Examples 1 to 4, Comparative Examples 1 to 2 and Reference Example 1.

EMBODIMENT FOR CARRYING OUT THE INVENTION

Hereinafter, the method for producing the LGPS-based solid electrolyte of the present invention will be specifically described. Note that materials, constitutions, etc. described below do not limit the present invention and can be modified variously within the range of the gist of the present invention.

Method for Producing LGPS-Based Solid Electrolyte

According to one embodiment of the present invention, the method for producing the LGPS-based solid electrolyte comprises: a step in which $Li_3PS_4$ crystals having an average particle diameter (D50) of 0.1 to 5 μm are mixed with crystals that are formed of Li, Sn and S, the crystals having an average particle diameter (D50) of 0.1 to 5 μm, to prepare a precursor; and a step in which the precursor is subjected to a heat treatment at 300 to 700° C.

The average particle diameter (D50) of the $Li_3PS_4$ crystals is preferably 0.1 to 4 μm, and more preferably 0.1 to 2.5 μm.

The average particle diameter (D50) of the crystals that are formed of Li, Sn and S (preferably crystals having a composition of $Li_4SnS_4$) is preferably 0.1 to 3 μm, and more preferably 0.1 to 1.5 μm.

The average particle diameter (D50) of the obtained LGPS-based solid electrolyte is preferably 0.5 to 5 μm, more preferably 0.1 to 4 μm, and particularly preferably 0.1 to 2.5 μm.

In the present invention, the average particle diameter (D50) of each of the above-described raw materials and product can be measured by the method described later in the Examples.

The LGPS-based solid electrolyte preferably has peaks at at least 2θ=20.18°±0.50°, 20.44°±0.50°, 26.96°±0.50° and 29.58°±0.50° in X-ray diffraction (CuKα: λ=1.5405 Å). More preferably, it has peaks at 2θ=17.38±0.50°, 20.18°±0.50°, 20.44°±0.50°, 23.56±0.50°, 26.96°±0.50°, 29.07±0.50°, 29.58°±0.50° and 31.71±0.50°.

Further, regarding the LGPS-based solid electrolyte, when the diffraction intensity of the peak at 2θ=29.58°±0.50° is referred to as $I_A$ and the diffraction intensity of the peak at 2θ=27.33°±0.50° is referred to as $I_B$, $I_B/I_A$ is preferably less than 0.50. More preferably, $I_B/I_A$ is less than 0.40. This is because the peak of LGPS crystals corresponds to $I_A$ and a crystal phase having low ion conductivity corresponds to $I_B$.

Moreover, it is preferred that the LGPS-based solid electrolyte has an octahedron O composed of Li and S, a tetrahedron $T_1$ composed of S and at least one element selected from the group consisting of P and Sn, and a tetrahedron $T_2$ composed of P and S, and mainly includes a crystal structure in which the tetrahedron $T_1$ and the octahedron O share an edge and the tetrahedron $T_2$ and the octahedron O share an apex as shown in FIG. 1.

As a conventional method for producing an LGPS-based solid electrolyte, after synthesizing an ionic conductor using $Li_2S$, $P_2S_5$ and $M_xS_y$ (e.g., $GeS_2$) as raw materials, a mechanical milling method using a vibrating mill or planetary ball mill (WO2011/118801) or a melt quenching method described in WO2014/196442 is carried out. However, in the case of the mechanical milling method, it is difficult to carry out increase in scale to an industrial scale, and carrying out the melt quenching method without being exposed to atmosphere is significantly limited in view of atmosphere control. Note that the LGPS-based solid electrolyte and raw materials thereof have a property that these react with moisture or oxygen in the atmosphere to change in quality. In this regard, according to the production method of the present invention, the amorphization step is not required. Microparticulated $Li_3PS_4$ crystals and microparticulated crystals that are formed of Li, Sn and S are used as raw materials and mixed in the presence of a solid phase or solvent to obtain a precursor, and then a heat treatment is carried out, thereby obtaining an LGPS-based solid electrolyte having a small particle diameter. Further, it is important to use the $Li_3PS_4$ crystals as raw materials because volatilization/decomposition of the precursor at the time of the heat treatment can be suppressed thereby. When $P_2S_5$ exists in the precursor (it can be judged by a Raman measurement), the generation of by-products and the amount of unreacted raw materials increase in the heat treatment step due to $P_2S_5$ having high volatility/decomposability, and for this reason, a stable and high-performance LGPS-based solid electrolyte cannot be easily obtained.

$Li_3PS_4$ Crystals

The $Li_3PS_4$ crystals to be used in the present invention may be either α, μ or γ type, but β-$Li_3PS_4$ is more preferred. This is because it exists relatively stably in the LGPS synthesis system.

As the $Li_3PS_4$ crystals in the present invention, a commercially-available product can be used, but for example, the $Li_3PS_4$ crystals can be synthesized from $Li_2S$ and $P_2S_5$ under inert gas atmosphere (e.g., argon). For example, $Li_2S$ and $P_2S_5$ are weighed so that the molar ratio of $Li_2S$:$P_2S_5$ becomes 1.5:1, and to a solvent such as tetrahydrofuran, $Li_2S$ and $P_2S_5$ are added in this order, and mixing is carried out at room temperature for about 5 to 15 hours. To the obtained mixture, $Li_2S$ is further added so that the composition of all the raw materials including the above-described ones becomes such that the molar ratio of $Li_2S$:$P_2S_5$=3:1, and mixing is carried out at room temperature for about 5 to 15 hours to obtain a suspension. The solvent is removed from the obtained suspension under reduced pressure at about 25 to 70° C. After that, it is vacuum dried at about 120 to 240° C. for 1 to 6 hours, thereby obtaining β-$Li_3PS_4$.

As the $Li_2S$ crystals, a synthesized product or commercially-available product can be used. The lower the content of moisture is, the better it is because mixing of moisture deteriorates the other raw materials and the precursor. The content is more preferably 300 ppm or less, and particularly preferably 50 ppm or less.

Microparticulation of $Li_3PS_4$ Crystals

One of the characteristics of the present invention is use of $Li_3PS_4$ crystals having an average particle diameter (D50) of 0.1 to 5 μm as raw materials.

The method for microparticulating the $Li_3PS_4$ crystals to be used in the present invention is not particularly limited as long as the $Li_3PS_4$ crystals have an average particle diameter (D50) of 0.1 to 5 μm. For example, under inert gas atmosphere (e.g., argon), $Li_3PS_4$ is added to a solvent such as acetonitrile, and mixing is carried out at room temperature to obtain a slurry. The solvent is removed from the obtained slurry under reduced pressure at about 25 to 70° C. After that, the obtained powder is dried under vacuum at about 120 to 240° C. for about 1 to 6 hours to remove a coordinating solvent. After that, it is cooled to room temperature, thereby obtaining microparticulated $Li_3PS_4$ powder.

Crystals That Are Formed of Li, Sn and S

The crystals that are formed of Li, Sn and S to be used in the present invention are not particularly limited, and particularly preferred examples thereof include crystals having a composition of $Li_4SnS_4$. Note that it is sufficient when the above-described specific crystals have the above-described composition, and the crystals may be constituted of a single crystal structure, or may be constituted of a combination of different crystal structures. For example, the crystals having a composition of $Li_4SnS_4$ may be constituted of a combination of $Li_4Sn_2S_6$ and $Li_2S$ with different crystal structures.

As the crystals having a composition of $Li_4SnS_4$ to be preferably used in the present invention, a commercially-available product may be used, but for example, the crystals can be synthesized from $Li_2S$ crystals and $SnS_2$ crystals under inert gas atmosphere (e.g., argon). For example, $Li_2S$ and $SnS_2$ are weighed so that the molar ratio of $Li_2S$:$SnS_2$ becomes 2:1, and the materials are mixed using an agate mortar. Subsequently, the obtained mixture is calcinated at 350 to 700° C. for 1 to 12 hours under inert gas atmosphere (e.g., argon), thereby producing crystals having a composition of $Li_4SnS_4$.

Note that there is no problem even when a part of the above-described raw materials to be used are amorphous.

For all the raw material crystals, it is important that the particle diameter is small, and the particle diameter is preferably 10 nm to 10 μm, more preferably 10 nm to 5 μm, and even more preferably 100 nm to 1 μm. Note that the particle diameter can be measured by means of SEM, a particle size distribution measurement apparatus utilizing laser scattering, or the like. By employing small particles, a reaction is easily performed at the time of the heat treatment, and the generation of by-products can be suppressed.

Microparticulation of Crystals That Are Formed of Li, Sn and S

One of the characteristics of the present invention is use of crystals that are formed of Li, Sn and S, the crystals having an average particle diameter (D50) of 0.1 to 5 μm, as raw materials.

The method for microparticulating the crystals that are formed of Li, Sn and S to be used in the present invention is not particularly limited as long as the crystals have an average particle diameter (D50) of 0.1 to 5 μm. For example, under inert gas atmosphere (e.g., argon), $Li_4SnS_4$ is added to methanol, and mixing is carried out at room temperature for about 3 to 8 hours. The obtained slurry is filtered using a membrane filter to obtain an $Li_4SnS_4$ homogeneous solution. The obtained $Li_4SnS_4$ homogeneous solution is mixed with acetonitrile to obtain a methanol-acetonitrile homogeneous solution. Methanol is removed from the obtained homogeneous solution under reduced pressure at about 30 to 70° C. to precipitate $Li_4SnS_4$ in acetonitrile. After that, the conditions are kept (under reduced pressure, about 30 to 70° C.), and acetonitrile is removed. The obtained powder is dried under vacuum at about 120 to 240° C. for about 1 to 6 hours to remove a coordinating solvent. After that, it is cooled to room temperature, thereby obtaining microparticulated $Li_4SnS_4$ powder.

Precursor Synthesis Step

In the precursor synthesis step, the microparticulated $Li_3PS_4$ crystals are mixed with the microparticulated crystals that are formed of Li, Sn and S to obtain the precursor. The molar ratio thereof may be adjusted so as to provide the ratio of elements constituting the above-described crystal structure. For example, in the case of $Li_{10}SnP_2S_{12}$, mixing is carried out at a molar ratio of $Li_3PS_4$:$Li_4SnS_4$=2:1.

The mixing method can be carried out in the presence of a solid phase or solvent. Note that the mixing method using a solvent is suitable for the case of large-scale synthesis because homogeneous mixing can be performed thereby. When using a solvent, it is preferred to use a solvent which does not react with raw materials or a precursor obtained. Examples of the solvent include an ether-based solvent, an ester-based solvent, a hydrocarbon-based solvent and a nitrile-based solvent. Specific examples thereof include tetrahydrofuran, cyclopentyl methyl ether, diisopropyl ether, diethyl ether, dimethyl ether, dioxane, methyl acetate, ethyl acetate, butyl acetate and acetonitrile. For preventing deterioration of the raw material composition, it is preferred to remove oxygen and moisture in the solvent in advance. In particular, regarding the moisture content, it is preferably 100 ppm or less, and more preferably 50 ppm or less. Mixing is preferably performed under inert gas atmosphere. As the inert gas, nitrogen, helium, argon or the like can be used, and by also removing oxygen and moisture in the inert gas, deterioration of the raw material composition can be suppressed. The concentration of each of oxygen and moisture in the inert gas is preferably 1000 ppm or less, more preferably 100 ppm or less, and particularly preferably 10 ppm or less.

At the time of mixing, a substrate may be in a homogeneously dispersed slurry state, but more preferably, a part of raw materials (regardless of the type) is dissolved. In the case of a slurry, it is preferably disintegrated by means of stirring for the purpose of crushing aggregated particles. Moreover, a homogenizer or an ultrasonic disperser may also be used.

In the case of mixing in the presence of a solid phase, mixing by using a mortar, a mortar machine, a ball mill or the like can be used. In the case of these methods, usually, crystals are not amorphized. Regarding mixing, synthesis is preferably performed under vacuum or inert gas atmosphere, and conditions thereof are the same as those in the case of using a solvent.

Regarding the temperature for mixing, heating is not required, but in the case of using a solvent, heating can be performed for increasing the solubility or dissolution speed of the substrates. When heating is performed, it is sufficient when it is performed at a temperature that is the boiling point of the solvent or lower. However, heating can also be performed under the pressurized state using an autoclave or the like. Note that when mixing is carried out at a high temperature, the reaction proceeds before the raw materials are sufficiently mixed and by-products are easily generated. For this reason, mixing is preferably carried out at near room temperature.

Regarding the mixing time, it is sufficient when the time necessary for obtaining a homogenous mixture can be ensured. The time is often influenced by a manufacturing scale, but for example, a homogenous mixture can be obtained by mixing for 0.1 to 24 hours.

When using the solvent, the precursor is obtained by removing the solvent. The solvent is removed by means of heated-air drying or vacuum drying, and the optimum temperature for it varies depending on the type of the solvent. The time for removing the solvent can be shortened by applying a temperature sufficiently higher than the boiling point. The temperature for removing the solvent is preferably 60 to 280° C., and more preferably 100 to 250° C. By removing the solvent under reduced pressure as in the case of vacuum drying or the like, the temperature at the time of removing the solvent can be lowered and the required time can be shortened. In addition, the time required for removing the solvent can also be shortened by flowing an inert gas such as nitrogen and argon in which the moisture content is sufficiently low. Note that the heat treatment step described below and removal of the solvent can be carried out simultaneously.

Heat Treatment Step

In the production method of the present invention, the precursor obtained in the precursor synthesis step is heat treated, thereby obtaining an LGPS-based solid electrolyte having a small particle diameter. The heat treatment temperature is 300 to 700° C., preferably 350 to 650° C., and particularly preferably 450 to 600° C. When the temperature is lower than the above-described range, desired crystals are not easily generated, and when the temperature is higher than the above-described range, crystals other than those desired are generated.

The heat treatment time slightly varies depending on the heat treatment temperature, but usually, crystallization is sufficiently performed when the heat treatment time is 0.1 to 24 hours. It is not preferred that heat treatment is carried out at a high temperature for a long period of time which exceeds the above-described range because there is concern for change in quality of the LGPS-based solid electrolyte.

The heat treatment can be performed under vacuum or inert gas atmosphere, but preferably performed under inert gas atmosphere. As the inert gas, nitrogen, helium, argon or the like can be used, and among them, argon is preferred. The contents of oxygen and moisture are preferably low, and conditions thereof are the same as those at the time of mixing in the precursor synthesis step.

The LGPS-based solid electrolyte of the present invention obtained in the above-described manner can be formed into a desired formed body by various means and can be used for various applications including an all-solid-state battery described below. The forming method is not particularly limited. For example, a method similar to the method for forming respective layers constituting the all-solid-state battery described below with respect to the all-solid-state battery can be used.

All-Solid-State Battery

The LGPS-based solid electrolyte of the present invention can be used, for example, as a solid electrolyte for all-solid-state batteries. Further, according to another embodiment of the present invention, an all-solid-state battery comprising the above-described solid electrolyte for all-solid-state batteries is provided.

In this regard, the "all-solid-state battery" is an all-solid-state lithium ion secondary battery. FIG. 2 is a schematic cross sectional view of an all-solid-state battery according to one embodiment of the present invention. An all-solid-state battery 10 has a structure in which a solid electrolyte layer 2 is arranged between a positive electrode layer 1 and a negative electrode layer 3. The all-solid-state battery 10 can be used in various devices including mobile phones, personal computers and automobiles.

The LGPS-based solid electrolyte of the present invention may be contained as a solid electrolyte in at least one of the positive electrode layer 1, the negative electrode layer 3 and the solid electrolyte layer 2. In the case where the LGPS-based solid electrolyte of the present invention is contained in the positive electrode layer 1 or negative electrode layer 3, the LGPS-based solid electrolyte of the present invention is used in combination with a publicly-known positive electrode active material or negative electrode active material for lithium ion secondary batteries. The quantitative ratio of the LGPS-based solid electrolyte of the present invention to be contained in the positive electrode layer 1 or negative electrode layer 3 is not particularly limited.

In the case where the LGPS-based solid electrolyte of the present invention is contained in the solid electrolyte layer 2, the solid electrolyte layer 2 may be composed of the LGPS-based solid electrolyte of the present invention alone, and according to need, an oxide solid electrolyte (e.g., $Li_7La_3Zr_2O_{12}$), a sulfide-based solid electrolyte (e.g., $Li_2S—P_2S_5$), other complex hydride solid electrolytes (e.g., $LiBH_4$ and $3LiBH_4—LiI$), etc. may be suitably used in combination.

The all-solid-state battery is prepared by forming and laminating the above-described layers, and the forming method and laminating method for the respective layers are not particularly limited.

Examples thereof include: a method in which a solid electrolyte and/or an electrode active material are dispersed in a solvent to provide a slurry-like mixture, which is applied by a doctor blade, spin coating or the like and subjected to rolling to form a film; a gas phase method in which film forming and lamination are performed by using a vacuum deposition method, ion plating method, sputtering method, laser ablation method or the like; and a pressing method in which powder is formed by hot pressing or cold pressing (not heating) and laminated.

Since the LGPS-based solid electrolyte of the present invention is relatively soft, it is particularly preferred to prepare the all-solid-state battery by forming the respective layers by means of the pressing method and laminating the layers. As the pressing method, there are hot pressing in which heating is performed and cold pressing in which heating is not performed, but forming the layers can be sufficiently carried out even by means of cold pressing.

Note that the present invention includes a formed body obtained by heating and forming the LGPS-based solid electrolyte of the present invention. The formed body is suitably used as the all-solid-state battery. Further, the present invention includes a method for producing an all-solid-state battery, which includes a step of heating and forming the LGPS-based solid electrolyte of the present invention.

EXAMPLES

Hereinafter, the embodiments of the present invention will be more specifically described by way of examples, but the embodiments are not limited to the examples.

Method for Measuring Average Particle Diameter

Average particle diameters of $Li_3PS_4$ and crystals having a composition of $Li_4SnS_4$ used as raw materials and average particle diameters of solid electrolytes obtained were measured by the method described below.

A small amount of each of the above-described raw materials or solid electrolytes was sampled, the powder thereof was added to acetonitrile as a dispersion medium, and dispersion was carried out for 3 minutes using an ultrasonic homogenizer (UH-50 manufactured by SMT Co., Ltd.). Subsequently, the particle size distribution was measured using a laser scattering/diffraction type particle size distribution measuring apparatus (Misrotrac MT3000EXII manufactured by Nikkiso Co., Ltd.) to determine the average particle diameter (D50).

Example 1

Method for Producing β-$Li_3PS_4$

In a glovebox under argon atmosphere, $Li_2S$ (manufactured by Sigma-Aldrich, purity: 99.8%) and $P_2S_5$ (manufactured by Sigma-Aldrich, purity: 99%) were weighed so that the molar ratio of $Li_2S$:$P_2S_5$ became 1.5:1. Next, to tetrahydrofuran (manufactured by Wako Pure Chemical Industries, Ltd., super dehydrated grade), $Li_2S$ and $P_2S_5$ were added in this order so that the concentration of ($Li_2S$+$P_2S_5$) became 10 wt %, and mixing was carried out at room temperature for 12 hours. The mixture was gradually dissolved, and an almost homogeneous solution containing a slight amount of an insoluble matter was obtained.

To the obtained solution, $Li_2S$ was further added so that the composition of all the raw materials including the above-described ones became such that the molar ratio of $Li_2S$:$P_2S_5$=3:1, and mixing was carried out at room temperature for 12 hours to obtain a suspension. The solvent was removed from the obtained suspension under reduced pressure at 50° C. After that, it was vacuum dried at 180° C. for 4 hours, thereby obtaining β-$Li_3PS_4$. The series of operations was carried out in the glovebox under argon atmosphere.

The obtained β-$Li_3PS_4$ was subjected to Raman spectroscopy described later, and a peak at 420 $cm^{-1}$ corresponding to $PS_4^{3-}$ was confirmed. Note that the whole sulfide raw material used was crystalline.

Step of Microparticulation of i-$Li_3PS_4$

In the glovebox under argon atmosphere, to acetonitrile (manufactured by Wako Pure Chemical Industries, Ltd., super dehydrated grade), β-$Li_3PS_4$ synthesized in the above-described step was added in a manner such that the concentration thereof became 6 wt %, and mixing was carried out at room temperature to obtain a slurry.

Acetonitrile was removed from the obtained slurry under reduced pressure at 50° C. After that, the obtained powder was dried under vacuum at 180° C. for 4 hours to remove a coordinating solvent. Removal of the solvent was carried out while stirring the slurry. After that, it was cooled to room temperature, thereby obtaining microparticulated β-$Li_3PS_4$ powder. The average particle diameter (D50) of the microparticulated β-$Li_3PS_4$ powder was 2.1 μm.

Method for Producing Crystals Having Composition of $Li_4SnS_4$ $Li_2S$ (manufactured by Sigma-Aldrich, purity: 99.8%) and $SnS_2$ (Kojundo Chemical Laboratory Co., Ltd., 99.9%) were used as raw materials. In the glovebox under argon atmosphere, these materials were weighed so as to provide the stoichiometric proportion of crystals having a composition of $Li_4SnS_4$, and mixing was carried out for 15 minutes using an agate mortar. 1.0 g of the obtained powder and 15 zirconia balls (φ: 10 mm) were put into a 45-mL zirconia pot, and the pot was sealed. The zirconia pot was fixed to a planetary ball mill (manufactured by Fritsch Japan Co., Ltd.), and the ball mill treatment was carried out at 500 rpm for 10 hours. The precursor powder obtained by the ball mill treatment was calcinated at 450° C. for 8 hours, thereby obtaining crystals having a composition of $Li_4SnS_4$.

Step of Microparticulation of Crystals Having Composition of $Li_4SnS_4$

In the glovebox under argon atmosphere, 1 g of the crystals having the composition of $Li_4SnS_4$ synthesized in the above-described production step were weighed. Next, the weighed crystals having the composition of $Li_4SnS_4$ were added to 10 mL of methanol (manufactured by Wako Pure Chemical Industries, Ltd., super dehydrated grade, boiling point: 64° C.), and mixing was carried out at room temperature for 6 hours. The mixture was gradually dissolved, and a slurry containing an insoluble matter was obtained. The obtained slurry was filtered using a membrane filter (PTFE, pore size: 1.0 μm) to obtain a homogeneous solution of the crystals having the composition of $Li_4SnS_4$.

The homogeneous solution of the crystals having the composition of $Li_4SnS_4$ obtained as described above was mixed with 200 mL of acetonitrile (manufactured by Wako Pure Chemical Industries, Ltd., super dehydrated grade, boiling point: 82° C.) to obtain a methanol-acetonitrile homogeneous solution.

Methanol was removed from the obtained homogeneous solution under reduced pressure at 50° C. to precipitate the crystals having the composition of $Li_4SnS_4$ in acetonitrile. After that, the conditions were kept (under reduced pressure, 50° C.), and acetonitrile was removed to obtain powder. Removal of the solvent was carried out while stirring the homogeneous solution.

The powder obtained as described above was dried under vacuum at 180° C. for 4 hours to remove a coordinating solvent. After that, it was cooled to room temperature, thereby obtaining microparticulated powder of the crystals having the composition of $Li_4SnS_4$. The average particle diameter (D50) of the microparticulated powder of the crystals having the composition of $Li_4SnS_4$ was 1.1 μm.

Synthesis of $Li_{10}SnP_2S_{12}$

In the glovebox under argon atmosphere, the above-described microparticulated β-$Li_3PS_4$ and microparticulated crystals having the composition of $Li_4SnS_4$ were weighed so that the molar ratio of β-$Li_3PS_4$:$Li_4SnS_4$ became 2:1, and mixing was carried out using an agate mortar. The mixture was calcinated under argon atmosphere at 550° C. for 8 hours, thereby obtaining $Li_{10}SnP_2S_{12}$ crystals (LGPS-based solid electrolyte). The average particle diameter (D50) of the obtained solid electrolyte was 2.1 μm.

Example 2

$Li_{10}SnP_2S_{12}$ crystals were obtained in a manner similar to that in Example 1, except that "calcinated under argon atmosphere at 550° C. for 8 hours" of Example 1 was changed to "burned under argon atmosphere at 550° C. for 2 hours". The average particle diameter (D50) of the obtained solid electrolyte was 2.0 μm.

Example 3

In a glovebox under argon atmosphere, the β-$Li_3PS_4$ after the microparticulation step and the crystals having the composition of $Li_4SnS_4$ after the microparticulation step that were obtained in Example 1 were weighed so that the molar ratio of β-$Li_3PS_4$:$Li_4SnS_4$ became 2:1. To acetonitrile (manufactured by Wako Pure Chemical Industries, Ltd., super dehydrated grade), the weighed mixed powder was added in a manner such that the concentration thereof became 5 wt %, and mixing was carried out at room temperature to obtain a slurry. Acetonitrile was removed from the obtained slurry under reduced pressure at 50° C. After that, the obtained powder was dried under vacuum at 180° C. for 4 hours to remove a coordinating solvent. Removal of the solvent was carried out while stirring the slurry. After that, it was cooled to room temperature to obtain precursor powder. It was calcinated under argon atmosphere at 550° C. for 8 hours, thereby obtaining $Li_{10}SnP_2S_{12}$ crystals. The average particle diameter (D50) of the obtained solid electrolyte was 3.6 μm.

Example 4

In a glovebox under argon atmosphere, the β-$Li_3PS_4$ after the microparticulation step and the crystals having the composition of $Li_4SnS_4$ after the microparticulation step that were obtained in Example 1 were weighed so that the molar ratio of β-$Li_3PS_4$:$Li_4SnS_4$ became 2.7:1. 600 mg of the weighed precursor powder and 80 g of zirconia balls having a diameter of 3 mmφ were put into a 50 cc Duran bottle and it was sealed. All the above-described operations of weighing, adding and sealing were carried out in the glovebox under argon atmosphere, and all the apparatuses to be used were subjected to water removal using a dryer before use.

Using a ball mill stand (manufactured by Asahi-rika Co., Ltd., AV-1 type), the bottle was rotated at normal temperature at 60 rpm for 1 hour to perform mixing, and then powder was collected. It was calcinated under argon atmosphere at 550° C. for 2 hours, thereby obtaining $Li_{9.81}Sn_{0.81}P_{2.19}S_{12}$ crystals. The average particle diameter (D50) of the obtained solid electrolyte was 2.3 μm.

Comparative Example 1

In a glovebox under argon atmosphere, the β-$Li_3PS_4$ after the microparticulation step and the crystals having the composition of $Li_4SnS_4$ before the microparticulation step in Example 1 were weighed so that the molar ratio of β-$Li_3PS_4$:$Li_4SnS_4$ became 2:1, and mixing was carried out using an agate mortar. The mixture was calcinated under argon atmosphere at 550° C. for 8 hours, thereby obtaining $Li_{10}SnP_2S_{12}$ crystals. The average particle diameter (D50) of the powder of the crystals having the composition of $Li_4SnS_4$ that was not subjected to microparticulation was 11 μm. Further, the average particle diameter (D50) of the obtained solid electrolyte was 11 μm.

Comparative Example 2

In a glovebox under argon atmosphere, the β-$Li_3PS_4$ before the microparticulation step and the crystals having the composition of $Li_4SnS_4$ before the microparticulation step in Example 1 were weighed so that the molar ratio of β-$Li_3PS_4$:$Li_4SnS_4$ became 2:1, and mixing was carried out using an agate mortar. The mixture was calcinated under argon atmosphere at 550° C. for 8 hours, thereby obtaining $Li_{10}SnP_2S_{12}$ crystals. The average particle diameter (D50) of the β-$Li_3PS_4$ powder that was not subjected to microparticulation was 8.0 μm. Further, the average particle diameter (D50) of the obtained solid electrolyte was 6.8 μm. Note that Comparative Example 2 corresponds to the working example in Patent Document 1 (WO2018/173939) described in [BACKGROUND ART].

Reference Example 1

In synthesis of $Li_{10}SnP_2S_{12}$, raw materials were weighed so that the molar ratio of $Li_2S$:$P_2S_5$:$SnS_2$ became 5:1:1, and the materials were mixed using an agate mortar. Next, the obtained mixture was put into a 45-mL zirconia pot, zirconia balls ("YTZ" manufactured by Nikkato Corporation, φ: 10 mm, number: 15) were further put therein, and the pot was completely sealed. The pot was attached to a planetary ball mill ("P-7" manufactured by Fritsch) and mechanical milling was carried out at a rotation speed of 800 rpm for 10 hours to obtain precursor powder. It was calcinated under argon atmosphere at 475° C. for 8 hours, thereby obtaining $Li_{10}SnP_2S_{12}$ crystals. The average particle diameter (D50) of the obtained solid electrolyte was 30 μm.

TABLE 1

| | Average particle diameter (D50) of raw material | | Composition of | | Calcinating | Ionic | Average particle diameter (D50) of |
|---|---|---|---|---|---|---|---|
| | $Li_3PS_4$ | $Li_4SnS_4$ | solid electrolyte | Mixing method | conditions | conductivity | solid electrolyte |
| Example 1 | 2.1 μm | 1.1 μm | $Li_{10}SnP_2S_{12}$ | Mixing by mortar | 550° C., 8 h | 1.39 mS/cm | 2.1 μm |
| Example 2 | 2.1 μm | 1.1 μm | $Li_{10}SnP_2S_{12}$ | Mixing by mortar | 550° C., 2 h | 1.45 mS/cm | 2.0 μm |
| Example 3 | 2.1 μm | 1.1 μm | $Li_{10}SnP_2S_{12}$ | Slurry mixing | 550° C., 8 h | 1.07 mS/cm | 3.6 μm |
| Example 4 | 2.1 μm | 1.1 μm | $Li_{9.81}Sn_{0.81}P_{2.19}S_{12}$ | Mixing by ball mill | 550° C., 2 h | 2.25 mS/cm | 2.3 μm |
| Comparative Example 1 | 2.1 μm | 11 μm | $Li_{10}SnP_2S_{12}$ | Mixing by mortar | 550° C., 8 h | 2.76 mS/cm | 11 μm |
| Comparative Example 2 | 8.0 μm | 11 μm | $Li_{10}SnP_2S_{12}$ | Mixing by mortar | 550° C., 8 h | 1.21 mS/cm | 6.8 μm |

| | Raw materials | Mixing method | Burning conditions | Ion conductivity | Average particle diameter (D50) of solid electrolyte |
|---|---|---|---|---|---|
| Reference Example 1 | $Li_2S$, $P_2S_5$, $SnS_2$ | Planetary ball mill | 475° C., 8 h | 4.4 mS/cm | 30 μm |

X-ray Diffraction Measurement

Powders of the LGPS-based solid electrolytes obtained in Examples 1 to 4, Comparative Examples 1 to 2 and Reference Example 1 were subjected to the X-ray diffraction measurement under argon atmosphere at room temperature (25° C.) ("X' Pert3 Powder" manufactured by PANalytical, CuKα: λ=1.5405 Å).

The results of the X-ray diffraction measurement of the LGPS-based solid electrolytes obtained in Examples 1 to 4, Comparative Examples 1 to 2 and Reference Example 1 are shown in FIG. 3.

As shown in FIG. 3, in Examples 1 to 4, the diffraction peaks were observed at at least 2θ=20.18°±0.50°, 20.44°±0.50°, 26.96°±0.50° and 29.58°±0.40°, and the pattern corresponded to that of $Li_{10}SnP_2S_{12}$ of ICSD database.

Lithium Ionic Conductivity Measurement

Each of the LGPS-based solid electrolytes obtained in Examples 1 to 4, Comparative Examples 1 to 2 and Reference Example 1 was subjected to uniaxial molding (240 MPa) to obtain a disk having a thickness of about 1 mm and a diameter of 8 mm. The AC impedance was measured by the four-terminal method utilizing an In (indium) electrode at room temperature (25° C.) and at 10° C. intervals in temperature ranges of from 30° C. to 100° C. and to −20° C. ("SI1260 IMPEDANCE/GAIN-PHASE ANALYZER" manufactured by Solartron), and the lithium ionic conductivity was calculated.

Specifically, the sample was put into a thermostatic bath with its temperature being set at 25° C. and it was kept for 30 minutes, and after that, the lithium ionic conductivity was measured. Subsequently, the temperature of the thermostatic bath was increased at 10° C. intervals from 30° C. to 100° C., and at each temperature, it was kept for 25 minutes and then the ion conductivity was measured. After the measurement at 100° C. was finished, the temperature of the thermostatic bath was decreased at 10° C. intervals from 90° C. to 30° C., and at each temperature, it was kept for 40 minutes and then the lithium ionic conductivity was measured. Next, the lithium ionic conductivity of the sample after being kept in the thermostatic bath whose temperature was set at 25° C. for 40 minutes was measured. After that, the temperature of the thermostatic bath was decreased at 10° C. intervals from 20° C. to −20° C., and at each temperature, it was kept for 40 minutes and then the lithium ionic conductivity was measured. The measurement frequency range was 0.1 Hz to 1 MHz, and the amplitude was 50 mV. The measurement results of the lithium ionic conductivity at the time of decreasing the temperature are shown in FIG. 4.

In Examples 1 to 4, solid electrolytes having an average particle diameter (D50) of 4 μm or less were successfully produced while the ionic conductivity was maintained in the range of 1 mS/cm to 3 mS/cm.

Raman Spectroscopy (1) Preparation of Sample

A sample to be measured was prepared by using an airtight cell having quartz glass (Φ: 60 mm, thickness: 1 mm) at the upper portion as an optical window. In a glovebox under argon atmosphere, the sample was adhered to the quartz glass, then the cell was sealed and taken out from the glovebox, and Raman spectroscopy was carried out.

(2) Measurement Conditions

Using Laser Raman Spectrometer NRS-5100 (manufactured by JASCO Corporation), the measurement was carried out at an excitation wavelength of 532.15 nm for an exposure time of 5 seconds.

The results of Raman spectroscopy of the LGPS-based solid electrolytes obtained in Examples 1 to 4, Comparative Examples 1 to 2 and Reference Example 1 are shown in FIG. 5. With respect to each sample in Examples 1 to 4 and Comparative Examples 1 to 2, a peak at 420 $cm^{-1}$ corresponding to $PS_4^{3-}$ was confirmed. The Raman spectra of the $Li_{10}SnP_2S_{12}$ crystals of Examples 1 to 4 corresponded to that of $Li_{10}SnP_2S_{12}$ obtained by the standard synthesis method of Reference Example 1.

EXPLANATIONS OF LETTERS OR NUMERALS

1 positive electrode layer
2 solid electrolyte layer
3 negative electrode layer
10 all-solid-state battery

The invention claimed is:

1. A method for producing an LGPS-based solid electrolyte, which comprises:

mixing $Li_3PS_4$ crystals having an average particle diameter (D50) of 0.1 to 5 μm with crystals that are formed of Li, Sn and S, the crystals having an average particle diameter (D50) of 0.1 to 5 μm, to prepare a precursor; and heating the precursor at 300 to 700° C., wherein the obtained LGPS-based solid electrolyte has an average particle diameter (D50) of 0.5 to 5 μm.

2. The method according to claim 1, wherein the LGPS-based solid electrolyte has peaks at at least 2θ=20.18°±0.50°, 20.44°±0.50°, 26.96°±0.50° and 29.58°±0.50° in X-ray diffraction (CuKα: λ=1.5405 Å).

3. The method according to claim 2, wherein the $Li_3PS_4$ crystals are β-$Li_3PS_4$.

4. The method according to claim 1, wherein the $Li_3PS_4$ crystals are β-$Li_3PS_4$.

5. The method according to claim 4, wherein the heating is carried out under inert gas atmosphere.

6. The method according to claim 1, wherein the heating is carried out under inert gas atmosphere.

7. The method according to claim 6, wherein the LGPS-based solid electrolyte has an octahedron O composed of Li and S, a tetrahedron $T_1$ composed of S and at least one element selected from the group consisting of P and Sn, and a tetrahedron $T_2$ composed of P and S, and mainly includes a crystal structure in which the tetrahedron $T_1$ and the octahedron O share an edge and the tetrahedron $T_2$ and the octahedron O share an apex.

8. The method according to claim 1, wherein the LGPS-based solid electrolyte has an octahedron O composed of Li and S, a tetrahedron $T_1$ composed of S and at least one element selected from the group consisting of P and Sn, and a tetrahedron $T_2$ composed of P and S, and mainly includes a crystal structure in which the tetrahedron $T_1$ and the octahedron O share an edge and the tetrahedron $T_2$ and the octahedron O share an apex.

9. The method according to claim 8, wherein the crystals that are formed of Li, Sn and S have a composition of $Li_4SnS_4$.

10. The method according to claim 1, wherein the crystals that are formed of Li, Sn and S have a composition of $Li_4SnS_4$.

11. The method according to claim 1, wherein the LGPS-based solid electrolyte has peaks at at least 2θ=20.18°±0.50°, 20.44°±0.50°, 26.96°±0.50° and 29.58°±0.50° in X-ray diffraction (CuKα: λ=1.5405 Å).

* * * * *